US010921982B2

United States Patent
Perkuhn et al.

(10) Patent No.: US 10,921,982 B2
(45) Date of Patent: *Feb. 16, 2021

(54) DEVICE AND METHOD FOR OPERATING A DEVICE

(71) Applicant: VOLKSWAGEN AKTIENGESELLSCHAFT, Wolfsburg (DE)

(72) Inventors: Janine Perkuhn, Berlin (DE); Jens Baumgarten, Berlin (DE); Jian Lou, Berlin (DE); Lorenz Maurer, Berlin (DE); Elisabeth Eichhorn, Berlin (DE); Daniel Leuchter, Wolfsburg (DE); Mathias Kuhn, Berlin (DE); Hendrik Frank, Wolfsburg (DE)

(73) Assignee: Volkswagen Aktiengesellschaft

( * ) Notice: Subject to any disclaimer, the term of this patent is extended or adjusted under 35 U.S.C. 154(b) by 0 days.

This patent is subject to a terminal disclaimer.

(21) Appl. No.: 16/458,848

(22) Filed: Jul. 1, 2019

(65) Prior Publication Data

US 2019/0324638 A1 Oct. 24, 2019

Related U.S. Application Data

(63) Continuation of application No. 15/671,173, filed on Aug. 8, 2017.

(30) Foreign Application Priority Data

Aug. 8, 2016 (DE) .................... 10 2016 114 669.2

(51) Int. Cl.
*G06F 3/048* (2013.01)
*G06F 3/0488* (2013.01)
(Continued)

(52) U.S. Cl.
CPC .......... *G06F 3/04886* (2013.01); *B60K 35/00* (2013.01); *B60K 37/06* (2013.01);
(Continued)

(58) Field of Classification Search
None
See application file for complete search history.

(56) References Cited

U.S. PATENT DOCUMENTS

2013/0145360 A1 6/2013 Ricci
2014/0040742 A1 2/2014 Park et al.

FOREIGN PATENT DOCUMENTS

DE 102004029203 A1 12/2005
DE 102008061987 A1 6/2010
(Continued)

OTHER PUBLICATIONS

Office Action for Korean Patent Application No. 10-2017-0099625; dated Sep. 6, 2018.

*Primary Examiner* — Brian M Butcher
(74) *Attorney, Agent, or Firm* — Barnes and Thornburg LLP

(57) ABSTRACT

A method for operating a device, wherein a graphical user interface is generated and displayed on a display area. The user interface has at least one operating object assigned to an application program for controlling the device. Output data are generated and displayed in the region of the assigned operating object, wherein the application program has a function having exactly two activatable program states. The first program state is activated and the output data are generated based on the activated program state. An input gesture is detected based on the user interface. The operating object has a first region and a second region and the input gesture is assigned to the first region or to the second region.

18 Claims, 3 Drawing Sheets

(51) Int. Cl.
  B60K 37/06 (2006.01)
  B60K 35/00 (2006.01)
  G06F 3/0484 (2013.01)
  G06F 3/01 (2006.01)
  H05B 47/155 (2020.01)
(52) U.S. Cl.
  CPC ............ G06F 3/016 (2013.01); G06F 3/0484 (2013.01); G06F 3/0488 (2013.01); *B60K 2370/11* (2019.05); *B60K 2370/111* (2019.05); *B60K 2370/115* (2019.05); *B60K 2370/146* (2019.05); *B60K 2370/1438* (2019.05); *B60K 2370/164* (2019.05); *H05B 47/155* (2020.01)

(56) References Cited

FOREIGN PATENT DOCUMENTS

| | | |
|---|---|---|
| EP | 2838004 A2 | 2/2015 |
| EP | 2927791 A1 | 10/2015 |
| KR | 20130081362 A | 7/2013 |
| KR | 20140055023 A | 5/2014 |
| KR | 20150015655 A | 2/2015 |
| WO | 2014134671 A1 | 9/2014 |

DEVICE AND METHOD FOR OPERATING A DEVICE

PRIORITY CLAIM

This patent application is a continuation of U.S. patent application Ser. No. 15/671,173, filed 8 Aug. 2017, which claims priority to German Patent Application No. 10 2016 114 669.2, filed 8 Aug. 2016, the disclosures of which are incorporated herein by reference in their entireties.

SUMMARY

Illustrative embodiments relate to a method for operating a device, wherein a graphical user interface is generated and displayed on a display area. In this case, the user interface comprises at least one operating object which is assigned to an application program for controlling the device. Output data are generated and displayed by the application program in the region of the assigned operating object, wherein the application program has a function having exactly two activatable program states. In this case, the first program state is activated and the output data are generated on the basis of the activated program state. An input gesture is detected on the basis of the graphical user interface.

Illustrative embodiments also relate to an operating apparatus for operating a device comprising a graphics unit, by which graphics data of a graphical user interface are generatable. The operating apparatus furthermore comprises a computing unit, by which an application program for controlling the device is executable and output data of the application program are generatable. It additionally comprises a display unit having a display area, on which the user interface is displayable, and an input unit, by which an input gesture is detectable. In this case, the user interface comprises at least one operating object which is assigned to the application program, wherein the input data are displayable in the region of the assigned operating object. In this case, the application program has a function having exactly two activatable program states, namely a first and a second program state, wherein the first program state is activated. In this case, the output data are generatable on the basis of the activated program state.

BRIEF DESCRIPTION OF THE DRAWINGS

The disclosed embodiments will now be explained with reference to the drawings.

DETAILED DESCRIPTION

Figure 1:
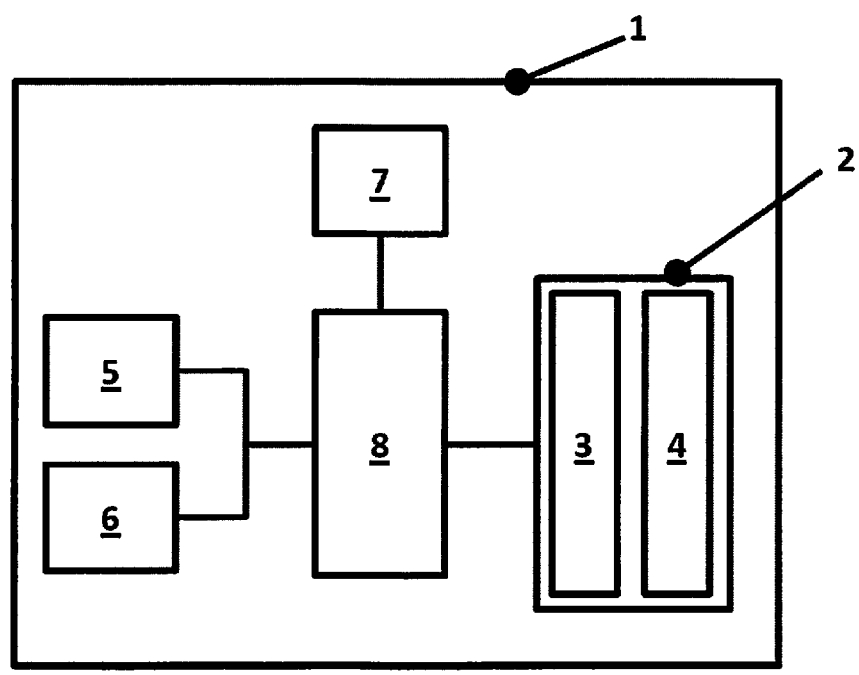
FIG. 1 shows an exemplary embodiment of the disclosed vehicle.

In many contexts, for example, when operating a modern motor vehicle, users are confronted with a multiplicity of electronic devices, the operation of which has to be made possible. The devices include, for example, systems for reproducing media contents, devices for making telephone calls, navigation systems, databases for accessing various items of information, and other devices for various tasks. To be able to operate the devices, use is often made of multifunctional operating systems comprising one or more multifunctional displays and operating elements which can be used to operate the devices. In this case, operation is assisted or conducted by the information reproduced on the multifunctional display. Furthermore, the operating system can be used to select what information is intended to be output.

The boundary conditions in the fashioning of operating concepts include the area which is available for displays, the area being limited for various reasons. This requires an efficient utilization of display areas, wherein at the same time operation that is as simple and clear as possible is intended to be made possible.

DE 10 2004 029 203 A1 describes an operating apparatus for a motor vehicle, wherein an operating panel is representable on a touchscreen and a continuously or quasi-continuously variable parameter is variable by sweeping across the operating panel.

In the case of the operating apparatus proposed in EP 2 838 004 A2, a touch-sensitive surface is provided, within which two separate areas are formed. In this case, a parameter is altered incrementally if one of the areas is touched or a sweeping gesture is carried out on the touch-sensitive surface.

Finally, DE 10 2008 061 987 A1 describes an operating method in which a button for varying a setting parameter is displayed, wherein the individual parameter is varied by a swiping gesture across the region of the button.

Therefore, the disclosed embodiments provide a method for operating a device, an operating apparatus for operating a device, and a vehicle which enable a rapidly detectable output of relevant information and simple operation.

The disclosed method of the type mentioned in the introduction is characterized in that the operating object has a first region and a second region and the input gesture is assigned to the first region or to the second region. In this case, if the input gesture has been assigned to the first region and comprises a gesture of a first gesture type, the second program state is activated. Furthermore, if the input gesture has been assigned to the second region and comprises a gesture of the first gesture type, a full image representation of the application program is generated and displayed.

As a result, on the basis of the program states a fundamental operation can be carried out by the operating object, without the full image representation of the application program having to be called up for this purpose. In this case, at the same time the call-up of the full image representation is carried out in a simple manner.

A "graphical user interface" within the meaning of the disclosure denotes a graphical representation for a human-machine interface. In this case, technical devices are operable by control elements, for which purpose, for instance, buttons or symbols of the representation can be used. The user interface comprises operating objects which represent the operation of a functionality in a manner comprehensible to a human being. By way of example, the absolute value of a parameter can be represented and its setting can be visualized by a setting element. The user interface can furthermore comprise elements for displaying information and thus enable an output that can be interpreted by a human being.

An "operating object" within the meaning of the disclosure is understood to be an object which is represented graphically on the display area and which is assigned to an application that is implemented, for example, by a device of a vehicle. An operating object can be formed as a widget object. In this case, it can display information in a specific region of the display area, the information being continuously updated. By way of example, the operating object can display route information of a navigation system, current messages concerning the weather, concerning the state of the road and concerning the state of traffic, and information concerning multimedia devices. The operating object is represented independently of the further display content of the display area. If the operating object is embodied as a display window, graphical objects in the display window can also be operating objects or widget objects. In this case, the user has access to other operating objects via the display window.

In this case, the operating objects of the user interface are displayed in a specific area region of the display area. In this case, provision is made for the user interface to comprise a multiplicity of operating objects, wherein the operating objects can be arranged in the manner of tiles, that is to say that the operating objects are formed geometrically such that they adjoin one another and substantially completely cover a specific area region. In this case, provision can furthermore be made for the operating objects within the meaning of the disclosure to be arranged in a specific area region of the user interface, while a further area region is excluded from the operating objects, for example, an area region for an information display that is formed differently from the operating objects.

According to the disclosed embodiments, the operating object has a first and a second region. In this case, the input gesture is interpreted depending on the region of the operating object in which it was detected. The operating object is displayed such that the two regions are clarified, for example, by a line that demarcates the regions from one another, or by a deviating configuration, for example, by a different color, brightness and/or structuring. In this case, the represented demarcation of the two regions need not necessarily correspond to how input gestures are interpreted. For example, the representation of the two regions can be effected such that the regions appear smaller than they are actually defined in the assignment of the input gesture.

According to the disclosed embodiments, it is provided that a full image representation of the application program can be displayed. This is effected after the detection of an input gesture which is assigned to the second region and comprises a gesture of the first gesture type. In this case, a change is made between a representation of the output data of the application program by the operating object and the full image representation. The full image representation differs from the representation of the operating object in terms of the area occupied by the display of the output data. By way of example, if the full image representation is displayed, no further operating object within the meaning of the disclosure can be represented. However, in the case of the full image representation of the application program, it is possible to provide regions of the display area in which a display is effected independently of the output data of the application program. By way of example, this can be an information region, for instance, a status bar or a navigation region displaying information of overarching importance, for example, a time of day.

According to the disclosed embodiments, the device to be controlled is controlled by an application program. By the display of the output data it is possible to output information associated with the application program. Furthermore, operation can be effected by the graphical user interface or the operating object, wherein parameters for the operation of the device can be varied by a user input. Two activatable program states of a function of the application program are provided for this purpose.

In this case, the program states can be formed in a manner known per se. They concern a basic functionality of the device, for instance, the activation or deactivation of a specific activity of the device. For example, a functionality can be switched on and off on the basis of the program states. According to the disclosed embodiments, it is provided that firstly a specific program state is activated.

The output data are generated such that a user can detect the activated program state. By way of example, this can be effected by a display of a symbol which is assigned to the activated program state. Furthermore, in a manner known per se it is possible to provide different forms of representation in terms of which the displayed output data can differ depending on the activated program state.

The input gesture is detected in a manner known per se. In this case a touch-sensitive surface is used, wherein a position of a touch on the touch-sensitive surface is detected. If appropriate, further parameters of the touch, for instance, an intensity or a time duration, can be detected.

The gesture is carried out by an actuation object, for example, by a stylus or the hand or a finger of the user. A "gesture" within the meaning of the disclosure is understood to be a specific position and/or emplacement of the actuation object or a specific movement which is carried out with the actuation object.

In this case, the gestures can be configured in a way known per se. They can be classified as different gesture types, wherein a "gesture type" denotes, for example, a set of gestures which can be described by specific parameters. These can be tapping gestures, for example, by which a specific position within a detection region is completely determined, for example, by a touch of a surface at a specific position. Furthermore, a touch duration can be taken into account. Moreover, a gesture type can comprise swiping gestures, for example, wherein a swiping gesture is described by a start position, at which a touch of the surface commences, and an end position, at which the touch is ended, and if appropriate a movement sequence from the start position to the end position.

In at least one disclosed embodiment of the method, the application program furthermore has at least two selectable functional parameters, wherein the output data are furthermore generated on the basis of the selected functional parameter. In this case, a first functional parameter is selected and if the input gesture comprises a gesture of a second gesture type, a further functional parameter is selected. The function of the application program has the functional parameters.

As a result, the application program can be operated by the selection of the functional parameter. In this case, the functional parameters comprise parameters for the operation of the application program or the function of the application program which are not encompassed by the two program states. For example, functional parameters can comprise information that specifies, for example, the execution of the application program, for instance, by indicating a memory location of a file to be processed by the application program.

In this case, provision can be made for the gesture of a second gesture type to be interpreted independently of the region of the operating object to which it is assigned. In this case, the gesture can be performed with lower accuracy, such that less attention on the part of the user is necessary in this case. This is beneficial in the case of use in regions in which only little attention can be paid to the operation, for example, in a vehicle. For example, such a gesture can be detected in the first or second region of the operating object and/or the gesture can be assigned to none of the regions. Furthermore, the gesture can be detected such that it can be assigned to both regions, for example, in the case of a gesture which comprises a movement from one region to the other.

The first gesture type can comprise tapping gestures, and the second gesture type can comprise swiping gestures. That is to say that a gesture of the first gesture type defines a touch position in the region of the operating object. A gesture of the second gesture type defines a start position and end position. Furthermore, the course of a movement from the start position to the end position can be taken into account.

In a further disclosed embodiment, the functional parameters are stored in an ordered manner in a list. As a result, a simple selection of the functional parameters can be effected by running through the list of functional parameters.

The list is ordered in this case, that is to say that for each functional parameter of the list at least one succeeding and/or preceding functional parameter of the list is defined. Provision can be made for defining the first list entry as succeeding functional parameter upon reaching the end of the list, and conversely the last list entry upon reaching the start of the list.

In one development of the method, on the basis of the second gesture type, a first direction along a first movement axis is determinable and the further functional parameter is selected on the basis of the first direction. A simple selection of the functional parameter can be effected as a result.

For example, the direction can be determined on the basis of a start position and an end position of a swiping gesture. In this case, the movement axis can be defined as perpendicular or horizontal relative to a typical viewing of the user interface. The user interface can have at least one direction of extent, for example, a transverse and longitudinal extent in the case of an user interface embodied in a rectangular manner.

For example, a perpendicular movement axis can be defined such that it runs along the surface of the display area and perpendicularly to a typical horizontal reading direction on the display area. In this case, directions along the perpendicular movement axis can be interpreted as "upwards" or "downwards". The further functional parameter can then be selected by the next or previous list entry of the list of functional parameters being selected depending on the direction of the detected input gesture. For example, the next list entry can be chosen if the gesture was detected upwards, and the previous list entry if the gesture was detected downwards. In further examples, the selection can be carried out in some other way.

In at least one disclosed embodiment, on the basis of the second gesture type, a further direction along a further movement axis perpendicular to the first movement axis is furthermore determinable and if the input gesture has a direction along the further movement axis, a displacement of the graphical user interface is displayed. A variation of a represented excerpt from the user interface can be performed as a result.

Provision can be made for the user interface to be formed in a manner known per se such that it exceeds the dimensions of the display area, that is to say that the user interface cannot be completely displayed on the display area, rather an excerpt from the user interface is displayed. In this case, provision can be made, for example, for the displayed excerpt to be formed such that hidden regions of the user interface are arranged laterally alongside it. In this case, a lateral displacement of the user interface can be carried out to displace the represented excerpt. This can be represented, for instance, as continuous displacement or as step-by-step passage through different displays of excerpts. This can be carried out by a lateral swiping gesture, for example, wherein a horizontal direction towards the right or left is determinable in the case of the swiping gesture. The horizontal direction is perpendicular to the perpendicular direction of the first movement axis such as was described by way of example above. In other examples, the direction of the second movement axis can be defined in some other way.

In a further disclosed embodiment, the output data of the application program are displayed in the first region of the operating object. As a result, data can be output by the application program and detected by a user. In this case, the displayed output data can be formed in a manner known per se and comprise, for example, written information about operation of the application program. Furthermore, they can comprise graphical representations.

In a further disclosed embodiment, the output data output in the second region of the operating object are independent of the activated program state and the selected functional parameter. This makes it possible to ensure that the second region is formed in a manner easily recognizable to the user. By way of example, in the second region a symbol can be displayed which is directly related to the application program and displays to a user, for example, the fact that a full image representation of the application program can be called up by a gesture of the first gesture type in the second region. Furthermore, a neutral representation can be generated which does not output more detailed information about the operation of the application program, but rather serves, for example, merely for identification of the application program.

In one development, the graphical user interface is a main display. It is thus possible to operate the device proceeding from the main display.

In this case, a "main display" is understood to be a display which is displayed when a display unit to which the display area belongs is switched on. It can be switched on when the device to be operated and/or a system comprising the device, for example, a vehicle, is switched on. Furthermore, provision can be made for the main display to be reached easily to return to the main display proceeding from a menu or a display of an application program, for example, by actuating a switch or some other operating element. In this case, the main display can be configured by the user himself/herself. The user can configure different main displays for different themes. In this case, in the event of a change of theme, the associated main display is then displayed. A main display is generally also referred to as a home screen.

It can be provided that the call-up of the full image representation of an application program can only be effected from the main display. In this case, a further menu for calling up the full image representation is not provided, rather the main display is provided as such a menu for the user.

In at least one disclosed embodiment, the first region and the second region occupy the entire area of the operating object. The first and second regions do not overlap. As a result, the entire area of the operating object comprised by the user interface can be structured by the two regions. The operating object comprises no further regions. In this case, the graphical representation of the regions can be effected such that, for example, an interspace is displayed between the regions of the operating object, wherein positions of the interspace can also be assigned in each case to one of the regions.

In further exemplary disclosed embodiments, by contrast, further regions of the operating object can be provided, for example, to interpret inputs by a user in different ways depending on the different regions.

In one development, a media reproduction, a telephone device, a navigation system and/or an information system are/is controlled by the application program. As a result, relevant devices can be operated by the disclosed method. The function that is operable on the basis of the activatable program states can be formed specifically depending on the device to be operated.

For example, in the case of a media reproduction, a media file can be reproduced. In this case, the first program state can comprise a playback and the second program state a pausing of the reproduction. That is to say that if an input gesture of the first gesture type, for instance, a tapping gesture, is detected in the first region of the operating object, it is possible to switch between the playback and the pausing of the reproduction. Furthermore, reproducible media files can be organized as a list of objects. By an input gesture of the second input type, in particular a swiping gesture in a perpendicular direction, the next or previous entry of the list can be selected as media file to be played back.

In a further example, the program of a radio transmitter can be received and output during the media reproduction. In this case, the two program states can comprise playback and muting. In this case, it is possible to switch between the two program states by a gesture of the first gesture type in the first region of the operating object. Furthermore, it is possible to bring about a change of radio transmitter by an input gesture of the second type, wherein available radio transmitters are represented as objects of a list, for example, in a manner ordered according to their frequencies.

Furthermore, in the case of a telephone device, a list of available contacts can be available and the contacts can be selected by an input gesture of the second type, wherein the list entries are selected successively. When switching between the program states by the input gesture of the first type in the first region, it is possible to switch, for example, between calling and accepting a call.

In addition, in the case of a navigation system, for example, a list of destinations that can be headed for can be available. In this case, a destination can be selected by the input gesture of the second type. Furthermore, switching between the program states by the input gesture of the first type in the first region makes it possible, for example, to change between a two-dimensional view and a three-dimensional view of an output of the navigation system.

Different types of information can be output by an information system, wherein information of further devices is detected by the device to be operated. For example, this can be carried out in a vehicle in which, by the information system, data of different vehicle components and systems in the vehicle can be detected and output for the user. In this case, a list of objects which are assigned to different further devices can be available. A selection by a gesture of the second gesture type makes it possible to choose between the output of information for different devices. Furthermore, by switching between the program states by the input gesture of the first type in the first region of the operating object it is possible to carry out a fundamental operation, wherein it is possible, for example, to switch between different display forms or, depending on the further device for which information is currently output, to perform different operations for the further devices.

Analogously to the examples explained, the full image representation which is generated and displayed after an input gesture of the first type in the second region can comprise a display extending over a larger area region of the display area for the operation of the respective device.

The operating apparatus of the type mentioned in the introduction is characterized in that the operating object has a first region and a second region and the input gesture is assignable to the first region or to the second region. In this case, if the input gesture has been assigned to the first region and comprises a gesture of a first gesture type, the second program state is activatable. Furthermore, if the input gesture has been assigned to the second region and comprises a gesture of the first gesture type, a full image representation of the application program is generatable and displayable.

The disclosed operating apparatus is designed to implement the above-described method. The operating apparatus thus has the same benefits as the disclosed method.

In at least one disclosed embodiment of the operating apparatus, the display unit comprises a mobile device. The input unit can furthermore be comprised by a mobile device. As a result, a mobile device can be used for operating the device. In this case, the mobile device is an external unit vis-à-vis the device to be operated or vis-à-vis a system comprising the device to be operated. For example, the mobile device can be a mobile telephone of a user, a tablet computer, a portable computer, a smartwatch or some other mobile user device.

For example, it is possible to establish a disconnectable data-technological connection between the mobile device and the device to be operated. For example, this can be effected by a radio connection or a wired connection. In this case a touchscreen of a mobile device can be used to display the graphical user interface and to detect user inputs. In this case, in various embodiments, different operations can be performed by the mobile device or further devices.

In a further disclosed embodiment, the application program furthermore has at least two selectable functional parameters, wherein the output data are furthermore generatable on the basis of the selected functional parameter. In this case, a first functional parameter is selected, and if the input gesture comprises a gesture of a second gesture type, a further functional parameter is selectable. As a result, a rapid and simple selection of a functional parameter can be effected.

The first gesture type comprises tapping gestures and the second gesture type comprises swiping gestures. In the case of gestures of the second gesture type, a direction is determined, for example, upwards or downwards in the case of a swiping gesture, and the functional parameter is selected on the basis of the direction determined. In this case provision can be made for the functional parameters to be available as objects of an ordered list, wherein either the next or the previous object is selected on the basis of a swiping gesture being instituted. Furthermore, it can be provided that in the case of a gesture of the second gesture type for which a different direction, for example, toward the right or left, was determined, a displacement of the displayed user interface is displayed, for example, to change a represented excerpt from the user interface.

In one development, the device comprises a media reproduction system, a telephone device, a navigation system or an information system. Particularly important devices are operable as a result.

The disclosed vehicle comprises an operating apparatus of the type described above. The operating apparatus can thereby be used since, precisely in vehicles, simple and rapid operation is necessary which allows a driver of the vehicle to carry out inputs and to operate devices without further concentration on the operation.

At least one exemplary embodiment of the disclosed vehicle is explained with reference to FIG. 1.

A vehicle 1 comprises a graphics unit 5, a computing unit 6 and also a display unit 2, which are coupled to a control unit 8. In this case, the display unit 2 comprises a display area 3 and an input unit 4. Furthermore, a device 7 is coupled to the control unit 8, the device being a media reproduction system 7 in the exemplary embodiment.

In the exemplary embodiment illustrated, the input unit 4 is embodied as a touch-sensitive surface 4. The display unit 2 is therefore a so-called touchscreen 2. By way of example in this case, a film can be arranged above the display area 3, by which film the position of a touch of an actuation object can be detected. The actuation object may be a user's fingertip. The film can be embodied, for example, as a resistive touch film, a capacitive touch film or a piezoelectric film. Furthermore, the film can be embodied such that a heat flow emanating from a user's fingertip, for example, is measured. Different inputs can be obtained from the temporal development of the touch of the film. By way of example, in the simplest case, it is possible to detect the touching of the film at a specific position and to assign it to a graphical object displayed on the display area 3. Furthermore, it is possible to detect the duration of the touch at a specific position or within a specific region. Furthermore, gestures can be detected, wherein a change in a position of a touch over time is detected.

In further exemplary embodiments, it is provided that the touchscreen 2 is comprised by a mobile device. This can be, for example, a mobile telephone, a tablet computer, a portable computer or a further mobile device of a user. In this case, the touchscreen 2 can be disconnectably connected data-technologically to the control unit 8, for example, by a radio connection or wired connection. Provision can be made for a connection device for a mobile device to be provided in the vehicle, for example, a mount for a mobile device, which furthermore has a connection by which the data-technological connection can be established. In this case, the touchscreen 2 can be integrated into the system as an external device, for example, as an additional unit for displaying the graphical user interface and for extending the operating possibilities. In this case, in vehicles with few or small-area displays, it is possible to achieve an extension of the possibilities for displaying a graphical user interface.

At least one exemplary embodiment of the disclosed method is explained with reference to FIGS. 1, 2 and 3. The above-explained vehicle is taken as a departure point here.

By the graphics unit 5, graphics data of a graphical user interface 20 are generated and transmitted to the display unit 2, where they are displayed on the display area 3. In this case, the graphical user interface 20 is a main display, that is to say that it is displayed when the system is started, and it can be called up again by a simple operating action, for instance, by the actuation of a switch or button provided for this purpose. Furthermore, it is provided that the main display can be configured by a user.

Figure 2:
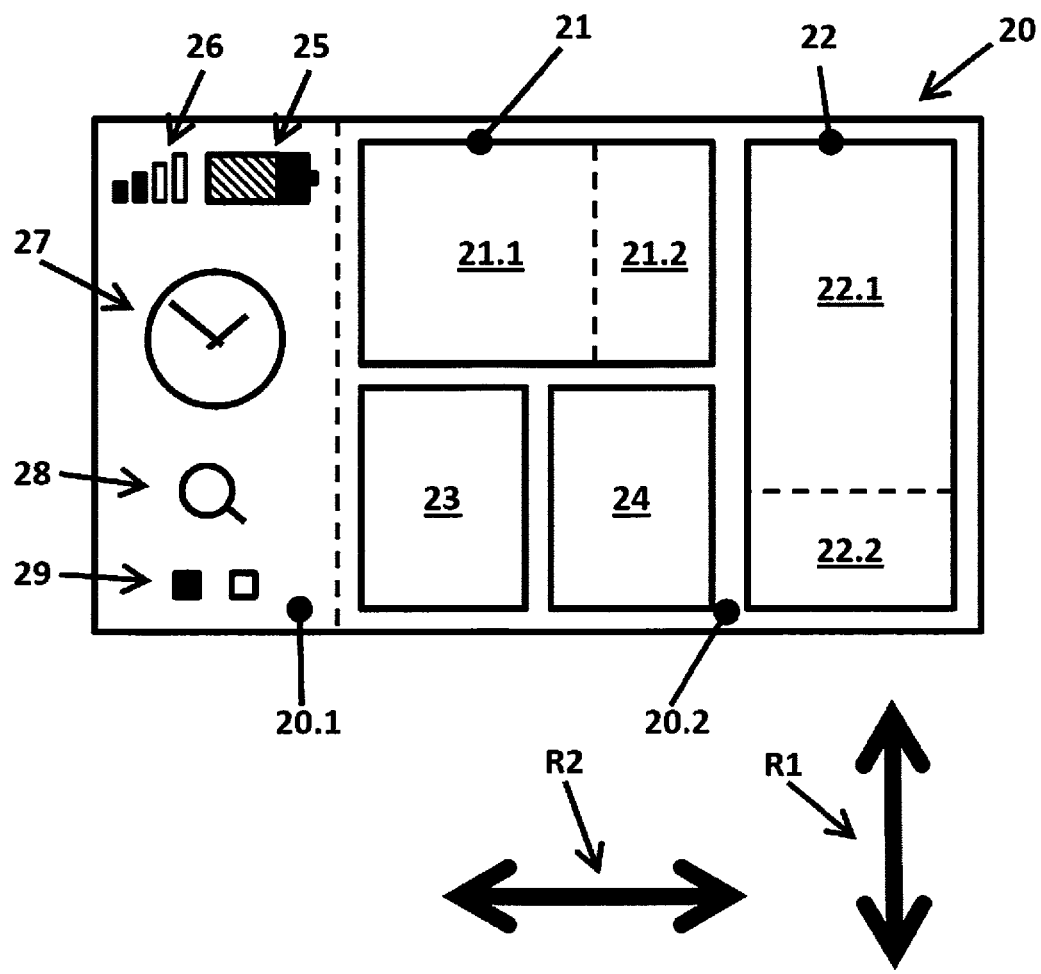
FIG. 2 shows an exemplary embodiment of a user interface generated by the disclosed method.
Figure 3:
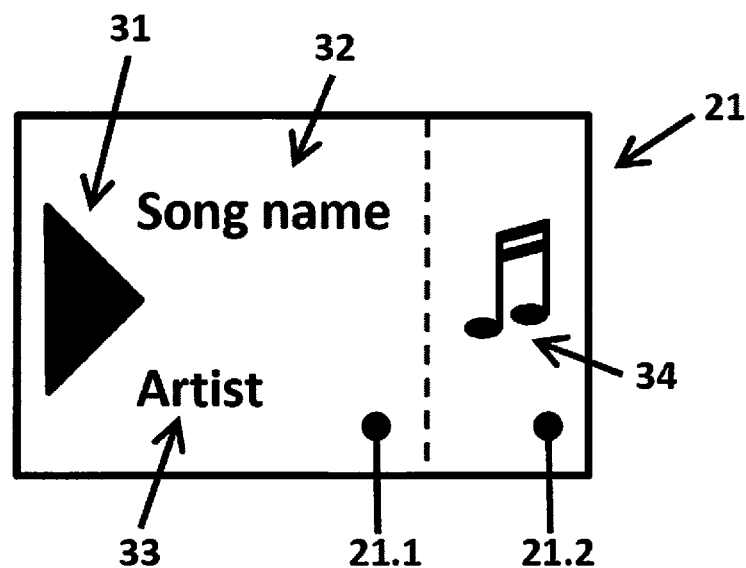
FIG. 3 shows an exemplary embodiment of an operating object of the user interface.

In the exemplary embodiment, the graphical user interface 20 comprises a navigation region 20.1 and an application region 20.2, wherein the boundary between the two regions is indicated by a dashed line in FIG. 2. In the exemplary embodiment, the user interface 20 is generated such that its dimensions exceed the representable size of the display area 3. Therefore, only an excerpt from the graphical user interface 20 can be represented. It is provided here that "scrolling" can be carried out in the application region 20.2, wherein different representations of the application region 20.2 are displayed as different pages of an overall representation, switching between which can be effected.

In the navigation region 20.1, various data are output by symbols, wherein the display of the navigation region 20.1 is independent of what applications are represented in the application region 20.2. In the exemplary embodiment, the graphical user interface 20 comprises in the navigation region 20.1 a symbol 26 for the representation of the quality of a mobile network that can be received, a symbol 25 for displaying a state of charge of, for example, a battery of the mobile device comprising the touchscreen 2, and a symbol 27 that outputs the time of day. Furthermore, a symbol 28 for a search function is included, wherein, by actuating the symbol 28 by tapping gesture, it is possible to call up a search function and represent it in the application region 20.2. Moreover, a symbol 29 for the view of the user interface 20 is included, wherein what kind of excerpt from the user interface is currently being displayed is displayed to the user, wherein two excerpts from the user interface are provided here, which excerpts can be displayed, wherein "scrolling" can be performed to switch between the two excerpts.

Operating objects 21, 22, 23, 24 assigned in each case to an application program are displayed in the application region 20.2. Various devices 7 of the vehicle 1, in particular the media reproduction system 7, can be operated by the assigned application programs. In this case, the operating objects 21, 22, 23, 24 are arranged as tiles, that is to say that they substantially completely fill the area of the application region 20.2. In this case, provision is made, moreover, for represented interspaces between the operating objects 21, 22, 23, 24 likewise to be assigned to the operating objects 21, 22, 23, 24, thus enabling an uninterrupted assignment of all positions within the application region 20.2. In this case, the operating objects 21, 22, 23, 24 are rectangular and have different dimensions. Provision is made for at least a portion of the operating objects 21, 22 to have two regions 21.1, 21.2, 22.1, 22.2, wherein the separation of the regions 21.1, 21.2, 22.1, 22.2 is represented here by dashed lines.

An input gesture is then detected by the touch-sensitive surface 4 of the touchscreen 2. On the basis of the input gesture, at least one position in the region of the graphical user interface 20 is determinable by the touch-sensitive surface 4. Two gesture types are differentiated here: in the exemplary embodiment, the first gesture type comprises tapping gestures, wherein a touch of the touch-sensitive surface 4 of the touchscreen 2 at a specific position is detected. Furthermore, a time duration of the touch can also be taken into account here. In the exemplary embodiment, the second gesture type comprises swiping gestures, wherein a start position and an end position of a touch are detected. Furthermore, intervening positions of a trajectory of the movement from the start position to the end position, can be detected and a temporal progression of the movement can be taken into account.

In the case of the user interface 20, two movement axes R1, R2 are provided, wherein the first movement axis R1 relative to the user interface 20 extends in a vertical direction, and the second movement axis R2 in a horizontal direction. Directions can be determined and classified on the basis of the movement axes R1, R2. Directions can be determined on the basis of a swiping gesture. For example, it is possible to determine whether a swiping gesture was carried out toward the right or left, upward or downward. In this way, various functionalities can be implemented on the basis of the different swiping gestures.

In the exemplary embodiment, it is provided that, in the case of a swiping gesture toward the left or right, switching between different pages or represented excerpts from the graphical user interface can be performed. In this case, during the detection of the swiping gesture it is possible to represent a movement of the graphical user interface, for example, a displacement of the contents represented in the display region 20.2 in a manner corresponding to the direction of the swiping gesture. The position of the changed excerpt is correspondingly displayed by the symbol 29 in the navigation region 20.1.

Furthermore, provision is made here for further gestures to be interpreted depending on the region 21.1, 21.2, 22.1, 22.2 of the operating objects 21, 22, divided in two, in which they are detected. One such operating object 21 is shown by way of example in FIG. 3.

The operating object 21 is assigned to an application program which makes it possible to operate the media reproduction system 7. It has the two regions 21.1 and 21.2, which are indicated by a dashed line in the figure. In the first region 21.1, a symbol 31 is displayed which outputs whether a reproduction is currently being effected and/or whether the reproduction is paused. Furthermore, text fields 32, 33 output further information about a media file being played, in this case a title and the name of an artist of a piece of music. The information represented here is provided as output data of the application program that controls the reproduction of media in the vehicle 1. In the second region 21.2, a symbol 34 is displayed which is assigned to the application program "media reproduction". The representation in the second region 21.2 is effected in a neutral manner, that is to say independently of the media file currently being played. In this case, the representation in the second region 21.2 can in various ways be formed differently from in the first region 21.1, for example, by virtue of a changed background color, structuring, brightness or other graphical effects.

If an input gesture is then detected in the region of the operating object 21, a differentiation is effected according to what gesture type the input gesture should be assigned to and what region 21.1, 21.2 the gesture was detected in. If an input gesture of the first gesture type, that is to say a tapping gesture, is detected in the first region 21.1, then switching between the continuation and pausing of the reproduction of the current media file is effected. The symbol 31 displayed in the first region 21.1 is correspondingly adapted to output the program state in a manner comprehensible to the user. By contrast, if the tapping gesture is detected in the second region 21.2, the representation of the graphical user interface 20 changes such that a full image representation of the application program for operating the media reproduction system 7 is represented in the application region 20.2. It is provided here that proceeding from the full image representation, by a further operating action, the display of the graphical user interface 20 can be switched to the main display.

If an input gesture of the second gesture type is detected, that is to say here a swiping gesture from top to bottom, or vice versa, in the exemplary embodiment no differentiation is made regarding which of the two regions 21.1, 21.2 of the operating object 21 the input gesture was detected in. In further exemplary embodiments, such a differentiation can be provided.

Depending on the direction of the swiping gesture upward or downward, the media file to be played back is selected. In this case available media files are present as entries of a list, wherein a previous entry and a subsequent entry are defined for each entry of the list. For example, it is possible to effect a selection of the subsequent list entry in the case of a swiping movement upward and, conversely, a selection of the previous list entry in the case of a swiping movement downward. Furthermore, the selection in the other exemplary embodiments can be effected in some other way.

LIST OF REFERENCE SIGNS

1 Vehicle
2 Display unit; touchscreen
3 Display area
4 Input unit; touch-sensitive surface
5 Graphics unit
6 Computing unit
7 Device; media reproduction system
8 Control unit
20 Graphical user interface
20.1 Navigation region
20.2 Application region
21; 22; 23; 24 Operating object; widget
21.1, 22.1 First region (operating object)
21.2; 22.2 Second region (operating object)
25 Symbol "state of charge"
26 Symbol "reception"
27 Symbol "Time of day"
28 Symbol "Search"
29 Symbol "View"
31 Symbol "playback"
32 Text field "title"
33 Text field "artist"
34 Symbol "media reproduction"
R1 First movement axis
R2 Further movement axis

The invention claimed is:

1. A method for operating a device, the method comprising:
   generating and displaying a graphical user interface on a display area of a user interface of a transportation vehicle, wherein the user interface comprises at least one operating object assigned to an application program for controlling the device;
   generating and displaying output data using an application program, wherein the output data are generated and displayed in the region of the assigned operating object, wherein the application program has a function having exactly two activatable program states consisting of a first program state and a second program state, wherein each activatable program state activates the function that is controlled by the application program in the region of the assigned operating object, and wherein the output data are generated based on the activated program state;
   while the first program state is activated, detecting an input gesture on the user interface, wherein the at least one operating object has a first region and a second region;
   assigning the detected input gesture to the first region or to the second region;
   in response to the input gesture having been assigned to the first region and the detected gesture being of a first gesture type, activating the second program state; and
   in response to the input gesture having been assigned to the second region and the detected gesture being of the first gesture type, generating and displaying a full image representation of the application program on the display area of the user interface of the transportation vehicle, wherein the application program has a plurality of selectable functional parameters that dictate generation of output data, and
wherein selection of one of the selectable functional parameters is based on both a currently selected one of the plurality of selectable functional parameters and a detected input gesture.

2. The method of claim 1, wherein:
the application program has at least two selectable functional parameters,
the output data are generated based on a selected functional parameter of the at least two selectable functional parameters,
the method further comprises, while a first selectable functional parameter is selected;
and in response to the input gesture being a gesture of a second gesture type, selecting a further selectable functional parameter of the at least two selectable functional parameters.

3. The method of claim 2, wherein the at least two selectable functional parameters are stored in an ordered list.

4. The method of claim 3, further comprising:
determining a first direction along a first movement axis based on the second gesture type; and
selecting the further selectable functional parameter based on the first direction.

5. The method of claim 2, further comprising:
based on the second gesture type, determining a further direction along a further movement axis perpendicular to the first movement axis; and
in response to the input gesture having a direction along the further movement axis, displaying a displacement of the graphical user interface.

6. The method of claim 1, wherein the output data of the application program are displayed in the first region of the operating object.

7. The method of claim 1, wherein the output data output in the second region of the operating object are independent of the activated program state and a selected functional parameter.

8. The method of claim 1, wherein the graphical user interface is a main display.

9. The method of claim 1, wherein the first region and the second region occupy the entire area of the operating object.

10. The method of claim 1, wherein at least one of a media reproduction, a telephone device, a navigation system, and an information system is controlled by the application program.

11. An operating apparatus for operating a device, the operating apparatus comprising:
a graphics unit which generates graphics data of a graphical user interface of a transportation vehicle;
a computing unit which executes an application program for controlling the device and generates output data of the application program;
a display unit having a display area which displays the user interface; and
an input unit which detects an input gesture;
wherein the user interface comprises at least one operating object assigned to the application program,
wherein the output data are displayable in the region of the assigned operating object,
wherein the application program has a function having exactly two activatable program states, wherein each activatable program state activates the function that is controlled by the application program in the region of the assigned operating object,
wherein while the first program state is activated, the output data are generatable based on the activated program state,
wherein the operating object has a first region and a second region,
wherein the input gesture is assignable to the first region or to the second region,
wherein, in response to the input gesture having been assigned to the first region and the input gesture being of a first gesture type, the second program state is activatable, and, in response to the input gesture having been assigned to the second region and the input gesture being of the first gesture type, a full image representation of the application program is generatable and displayable on the display area of the user interface of a transportation vehicle,
wherein the application program has a plurality of selectable functional parameters that dictate generation of output data, and
wherein selection of one of the selectable functional parameters is based on both a currently selected one of the plurality of selectable functional parameters and a detected input gesture.

12. The operating apparatus of claim 11, wherein the display unit comprises a mobile device.

13. The operating apparatus of claim 11, wherein the application program has at least two selectable functional parameters, wherein the output data are generatable based on the selected functional parameter, wherein a first selectable functional parameter is selected, and, in response to the input gesture being of a second gesture type, a further selectable functional parameter of the at least two selectable functional parameters is selectable.

14. The operating apparatus of claim 11, wherein the device comprises a media reproduction system, a telephone device, a navigation system or an information system.

15. A transportation vehicle comprising an operating apparatus for operating a device, wherein the operating apparatus comprises:
a graphics unit which generates graphics data of a graphical user interface of the transportation vehicle;
a computing unit which executes an application program for controlling the device and generates output data of the application program;
a display unit having a display area which displays the user interface; and
an input unit which detects an input gesture;
wherein the user interface comprises at least one operating object assigned to the application program,
wherein the output data are displayable in the region of the assigned operating object,
wherein the application program has a function having exactly two activatable program states, wherein each activatable program state activates the function that is controlled by the application program in the region of the assigned operating object,
wherein while the first program state is activated, the output data are generatable based on the activated program state,
wherein the operating object has a first region and a second region,
wherein the input gesture is assignable to the first region or to the second region,
wherein, in response to the input gesture having been assigned to the first region and the input gesture being of a first gesture type, the second program state is activatable, and, in response to the input gesture having been assigned to the second region and the input gesture being of the first gesture type, a full image representation of the application program is generatable and displayable on the graphical user interface of the transportation vehicle, wherein the application program has a plurality of selectable functional parameters that dictate generation of output data, and wherein selection of one of the selectable functional parameters is based on both a currently selected one of the plurality of selectable functional parameters and a detected input gesture.

16. The transportation vehicle of claim 15, wherein the display unit comprises a mobile device.

17. The transportation vehicle of claim 15, wherein the application program has at least two selectable functional parameters, wherein the output data are generatable based on the selected functional parameter, wherein a first selectable functional parameter is selected, and, in response to the input gesture being of a second gesture type, a further selectable functional parameter of the at least two selectable functional parameters is selectable.

18. The transportation vehicle of claim 15, wherein the device comprises a media reproduction system, a telephone device, a navigation system or an information system.

* * * * *